(12) United States Patent
Okabayashi (10) Patent No.: US 8,104,592 B2
(45) Date of Patent: Jan. 31, 2012

(54) DAMPER DEVICE

(75) Inventor: Shunsuke Okabayashi, Sagamihara (JP)

(73) Assignee: Nifco Inc., Yokohama-Shi (JP)

( * ) Notice: Subject to any disclaimer, the term of this patent is extended or adjusted under 35 U.S.C. 154(b) by 23 days.

(21) Appl. No.: 12/285,386

(22) Filed: Oct. 3, 2008

(65) Prior Publication Data

US 2009/0084645 A1 Apr. 2, 2009

Related U.S. Application Data

(63) Continuation of application No. PCT/JP2008/055445, filed on Mar. 24, 2008.

(30) Foreign Application Priority Data

Mar. 30, 2007 (JP) .................................. 2007-091728
May 29, 2007 (JP) .................................. 2007-142680

(51) Int. Cl.
*F16F 9/508* (2006.01)

(52) U.S. Cl. ................ 188/282.8; 188/322.14; 267/120; 267/64.22

(58) Field of Classification Search .................. 188/283, 188/284, 288, 289, 322.14, 270, 282.8, 282.9; 267/120, 124, 64.22; F16F 9/48
See application file for complete search history.

(56) References Cited

U.S. PATENT DOCUMENTS

| | | | | | |
|---|---|---|---|---|---|
| 3,127,958 | A | * | 4/1964 | Szostak ........................ | 188/275 |
| 3,321,051 | A | * | 5/1967 | Heckethorn .................. | 188/315 |
| 3,706,362 | A | * | 12/1972 | Faure .......................... | 188/282.8 |
| 4,082,169 | A | * | 4/1978 | Bowles ...................... | 188/322.14 |
| 4,109,767 | A | * | 8/1978 | Nandyal et al. .............. | 188/315 |
| 4,110,868 | A | * | 9/1978 | Imazaike ......................... | 16/84 |
| 4,303,231 | A | * | 12/1981 | Reuschenbach et al. .. | 267/64.15 |
| 4,346,794 | A | * | 8/1982 | Smeltzer ................... | 188/322.14 |
| 4,934,749 | A | * | 6/1990 | Folarin ......................... | 293/134 |
| 6,267,400 | B1 | * | 7/2001 | McAndrews ................ | 280/285 |
| 6,467,593 | B1 | * | 10/2002 | Corradini et al. ............. | 188/289 |
| 6,612,410 | B1 | * | 9/2003 | Antonovsky ................. | 188/280 |
| 6,851,528 | B2 | * | 2/2005 | Lemieux ................... | 188/322.14 |
| 6,959,797 | B2 | * | 11/2005 | Mintgen et al. .......... | 188/322.15 |
| 7,353,922 | B2 | * | 4/2008 | Furuya et al. ................ | 188/284 |
| 2005/0093213 | A1 | * | 5/2005 | Jang ............................ | 267/120 |

* cited by examiner

*Primary Examiner* — Bradley King
*Assistant Examiner* — Thomas Irvin
(74) *Attorney, Agent, or Firm* — Manabu Kanesaka (57) ABSTRACT

A damper device includes a cylinder body and a piston body. At least one of the cylinder body and the piston body is attached to an article subject to damping so that the damping is applied to a movement or a relative movement of the article subject to the damping. The damper device has a run-through hole formed in an inner recess part of the cylinder body facing the piston body, and a stopper body having a shaft part, which is inserted into the run-through hole. A dimension of insertion of the shaft part of the stopper body into the run-through hole changes by a change of pressure caused by a movement of the piston body.

11 Claims, 11 Drawing Sheets

DAMPER DEVICE

CROSS REFERENCE TO RELATED APPLICATION

This is a continuation application of PCT Patent Application No. PCT/JP2008/55445 filed on Mar. 24, 2008.

BACKGROUND OF THE INVENTION AND RELATED ART STATEMENT

This invention relates to an improvement of a damper device having a cylinder body and a piston body, at least either one side of which is attached to an article subject to damping, whereby damping is applied to the movement or relative movement of the article subject to damping.

There is an air damper having a piston and a cylinder, and including a stepped hole comprising a cylindrical hole and a conical hole formed on the closed one end of the cylinder, and being made so as to close this stepped hole with a rubber plate having a center hole from the outside of the cylinder (see Patent Document 1: Publication of Japanese Examined Patent Publication No. H4-48658 from page 2, column 4, line 33 to page 3, column 5, line 4). In such air damper, the rubber plate is drawn inside the conical hole of the stepped hole by the negative pressure caused inside the cylinder by the retreat of the piston and its center hole is made to contract whereby the retreat of the piston is made more difficult (that is, damping force is applied to the retreat of the piston).

However, in such air damper, because it is difficult to closely set the extent of contraction of the center hole of such rubber plate, it is difficult to set said damping force to the desired size, also, when the rubber plate deteriorates over time, the damping force changes. Also, in an automobile glove compartment, or the like, in order that a change is not caused in the speed of opening between when the weight of the articles stored inside is light and when it is heavy, it is required that such speed of opening be made roughly constant by this kind of air damper regardless of the weight or presence of articles stored inside.

The main problem that this invention attempts to solve is to easily perform setting of the damping force in this kind of damper device, and to exercise the set damping force stably over a long period. Also, when such damper is used in an automobile glove compartment, or the like, the speed of opening of such glove compartment, or the like, is always made roughly constant regardless of the weight or presence of articles stored inside.

Further objects and advantages of the invention will be apparent from the following description of the invention.

SUMMARY OF THE INVENTION

In order to accomplish the task, in a first aspect of the present invention, the damper device was made as one having the configuration, as follows.

A damper device comprises a cylinder body and a piston body, said damper device having at least either one side of these attached to an article subject to damping whereby damping is applied to the movement or relative movement of the article subject to damping, wherein the damper device has a run-through hole formed in the inner recess part of the cylinder body facing the piston body, and a stopper-like body having a shaft part, which is inserted into this run-through hole to be capable of movement and having a fluid passage gap formed between this shaft part and the run-through hole. Further, it is made such that the dimension of insertion of the shaft part of the stopper-like body into the run-through hole changes by a change of pressure caused by the movement or relative movement of the piston body.

When the piston body is moved or relatively moved by the movement or relative movement of the article subject to damping, the pressure inside the cylinder body changes, and because of that, the shaft part of the stopper-like body also is moved inside the run-through hole, and the dimension of insertion of this shaft part inside the run-through hole changes. Actually, because ideal fluids do not exist and all fluids have constant viscosity, as this dimension of insertion becomes larger, the range of the passage gap becomes longer and it becomes more difficult for the fluid to pass, while on the other hand, as this dimension of insertion becomes smaller, the range of the passage gap becomes shorter and it becomes easier for the fluid to pass. By this, typically, it is made such that damping is applied to the retreating movement or relative retreating movement of the piston body and damping is not applied to the advancing or relative advancing movement of the piston body, whereby it is possible to have the damping force applied to the movement or relative movement in a certain direction of the article subject to damping.

Also, the pressure inside the cylinder body changes according to the speed of movement of the piston body, and as the speed of movement becomes faster the dimension of insertion of said shaft part into the run-through hole is made larger by such change of pressure whereby it is possible to have the damping force applied greater to the piston body. Because of that, if it is made such that the piston body moves in linkage with the opening and closing of a glove compartment, or the like, it is possible to have damping force according to the weight of the stored articles applied to such glove compartment, or the like. That is, when the stored articles are heavy and the speed of opening of the glove compartment, or the like, is great, the change of pressure by the piston body becomes greater and consequently the amount of insertion of said shaft part inside the run-through hole becomes greater and comparatively great damping force is applied to this opening. On the other hand, if the stored articles are light and the speed of opening of the glove compartment, or the like, is small, the change of pressure by the piston body is small and consequently the amount of insertion of said shaft part inside the run-through hole also becomes smaller and comparatively small damping force is applied to this opening. Accordingly, the opening of such glove compartment, or the like, is always made substantially constant by such damper device regardless of the weight or presence of stored articles.

Also, in order to accomplish said task, in a second aspect of the present invention, the damper device was made as one having the configuration, as follows.

A damper device comprises a cylinder body and a piston body, said damper device having at least either one side of these attached to an article subject to damping whereby damping is applied to the movement or relative movement of the article subject to damping, wherein the damper device has a run-through hole formed in the inner recess part of the cylinder body facing the piston body, and a stopper-like body having a shaft part, which is inserted into this run-through hole to be capable of movement and having a fluid passage gap formed between this shaft part and the run-through hole. Further, on the shaft part of the stopper-like body, there is provided a throttle structure or a narrow portion, which changes the fluid passage gap between this shaft part and the run-through hole when this shaft part moves by a change of pressure caused by the movement or relative movement of the piston body.

By such configuration, it is made even more difficult or even easier for the fluid to pass through the passage gap on the moment of movement of the shaft part of the stopper-like body, whereby it is possible to have said damping force work markedly greater or smaller.

If the shaft part of the stopper-like body is made thicker gradually going from the side of the leading end inserted into the run-through hole toward the side of its base part, it is possible to make it even more difficult for the fluid to pass through the passage gap when the dimension of insertion of the shaft part into the run-through hole increases.

Also, in order to accomplish said task, in a third aspect of the present invention, the damper device was made as one having the configuration, as follows.

A damper device comprises a cylinder body and a piston body, said damper device having at least either one side of these attached to an article subject to damping whereby damping is applied to the movement or relative movement of the article subject to damping, wherein the damper device has a ventilation hole formed in the inner recess part of the cylinder body facing the piston body, a stopper-like body having a shaft part, which is inserted into this ventilation hole to be capable of sliding, and an impelling means for this stopper-like body. The shaft part of said stopper-like body has a groove following the direction of sliding starting from the shaft end of this shaft part positioned on the inward side of the cylinder body, and a throttle part, which reduces both or either one of the depth and the width of this groove, is formed on the side of the terminal end of this groove. It is made such that the throttle part of the shaft part of the stopper-like body is positioned outside the ventilation hole of the cylinder body by said impelling means, and the throttle part of the shaft part of the stopper-like body enters inside the ventilation hole by the change of pressure caused by the movement or relative movement of the piston body toward the direction moving away from the inner recess part of the cylinder body while causing force to accumulate in said impelling means.

When the piston body is moved or relatively moved toward the direction of approaching the inner recess part of the cylinder body by the movement or relative movement of the article subject to damping, the air inside the cylinder body is exhausted through the space between the groove of the shaft part of the stopper-like body and the inner face of the ventilation hole.

When the piston body is moved or relatively moved toward the direction of moving away from the inner recess part of the cylinder body by the movement or relative movement of the article subject to damping, the inside of the cylinder body becomes negatively pressurized and therefore a force toward the direction of being pulled in the direction of movement of the piston body is applied to the shaft part of the stopper-like body, and the stopper-like body is moved while causing force to be accumulated in the impelling means. When the stopper-like body is moved thus, said throttle part enters inside the ventilation hole, and because of that, it becomes more difficult for the air to be taken inside the cylinder, and damping is applied to the movement or relative movement of the piston body. By this, it is possible to have damping force applied to the movement or relative movement of the article subject to damping.

Because the stopper-like body having the functions of narrowing and widening the air channel in the ventilation hole exercises these functions only by such movement, it does not incur deterioration such as losing these functions over time.

If it is made such that the throttle part is constituted by forming the groove bottom on the side of the terminal end of the groove of the shaft part of the stopper-like body in a tapered shape, it can be made such that the resistance to the movement of the piston body becomes greater as the amount of insertion of the throttle part into the ventilation hole becomes greater. When it is made as such, it can be made such that when the movement or relative movement of the piston body is slow the amount of insertion of the throttle part into the ventilation hole becomes smaller and therefore the damping force on this piston body and consequently on the article subject to damping is made smaller, and when the movement or relative movement of the piston body is fast the amount of insertion of the throttle part into the ventilation hole becomes greater and the damping force on this piston body and consequently on the article subject to damping is made greater.

It also may be that a coupling part, which is coupled with a part coupled with on the side of the cylinder body in the state when the shaft part was inserted into the ventilation hole, is formed on the stopper-like body.

In this case, it furthermore may be that the inner recess part of the cylinder body is constituted with a partitioning plate, which partitions the cylindrical body, and a window hole-shaped part coupled with is formed on the cylindrical body on the outside of this partitioning plate. The stopper-like body has a head part integrally having the shaft part, and has a claw-shaped coupling part, which enters into said part coupled with, on this head part.

When it is made as such, the stopper-like body is inserted from outside of the partitioning plate of the cylindrical body constituting the cylinder body into this cylindrical body in a manner such that the shaft part is inserted into the ventilation hole, whereby the coupling part is made to be coupled with the part coupled with and the state having the shaft part of the stopper-like body inserted into this ventilation hole can be maintained. Also, the intake and exhaust of air into/from the cylinder body through such part coupled with and ventilation hole can be assured.

Also, it also may be that it has a cover, which closes the cylinder end on the outside of the partitioning plate on the cylindrical body constituting the cylinder body in the state when the head part of the stopper-like body is held between it and this partitioning plate.

When it is made as such, it can be made such that accidents are not caused, such as a member, or the like, disposed in the periphery of the place where the damper device is placed pushing against the stopper-like body, or the like, and causing the throttle part to be inserted unexpectedly inside the ventilation hole.

In such damper device of this invention, because it is made such that damping force is applied to the movement or relative movement of the piston body by the movement of the shaft part of the stopper-like body inserted into the run-through hole or the ventilation hole, setting of this damping force is easy to perform. Also, it exercises the set damping force stably over a long period. Furthermore, when such damper is used in an automobile glove compartment, or the like, the speed of opening of such glove compartment, or the like, can be always made roughly constant regardless of the weight or presence of articles stored inside.

DETAILED DESCRIPTION OF PREFERRED EMBODIMENTS

Preferred embodiments of the invention are explained below with reference to FIG. 1 to FIG. 13.

Figure 1:
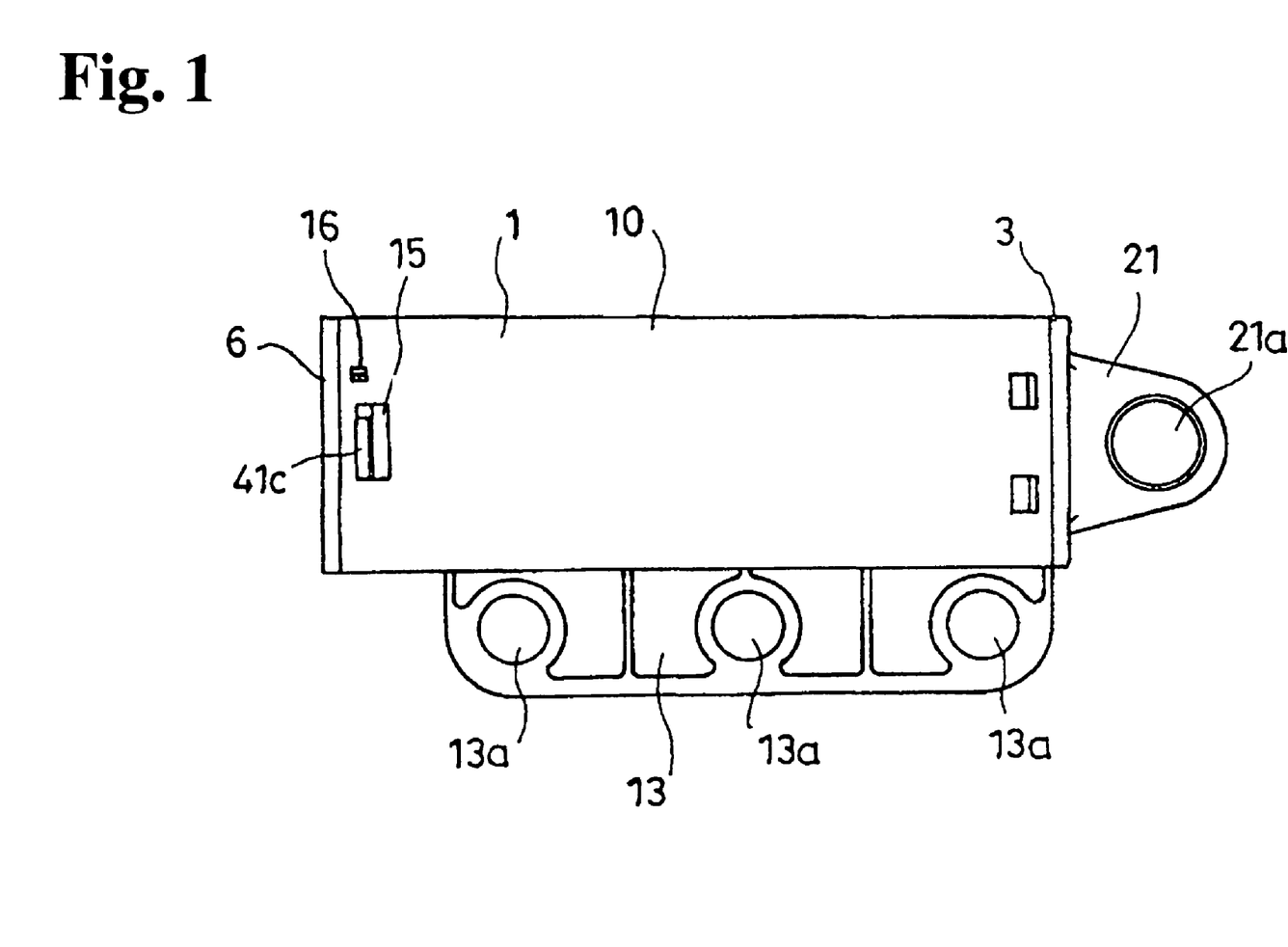
FIG. 1 is a side view of a damper device pertaining to an embodiment of the present invention.
Figure 2:
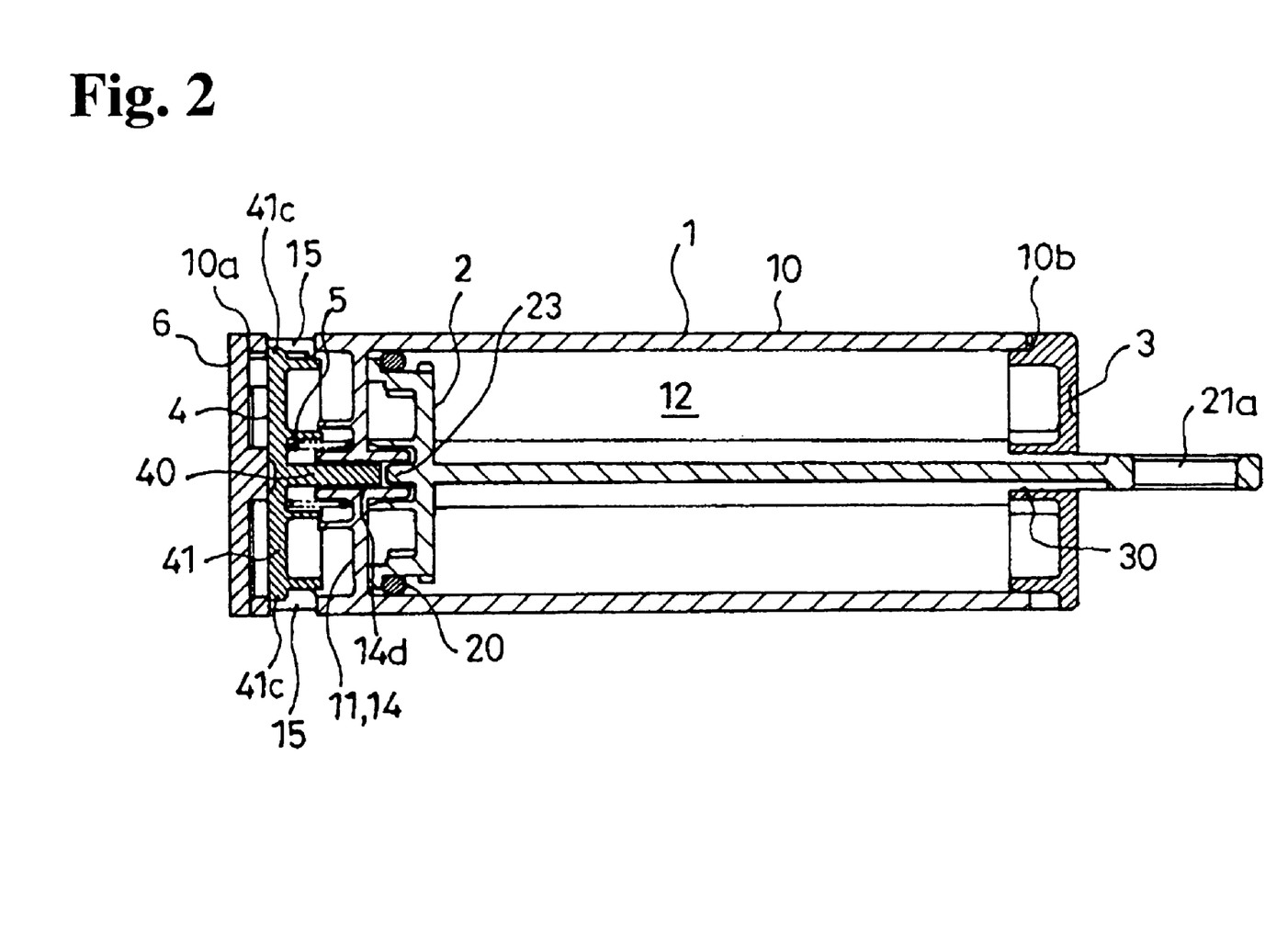
FIG. 2 is a sectional view of the same.
Figure 3:
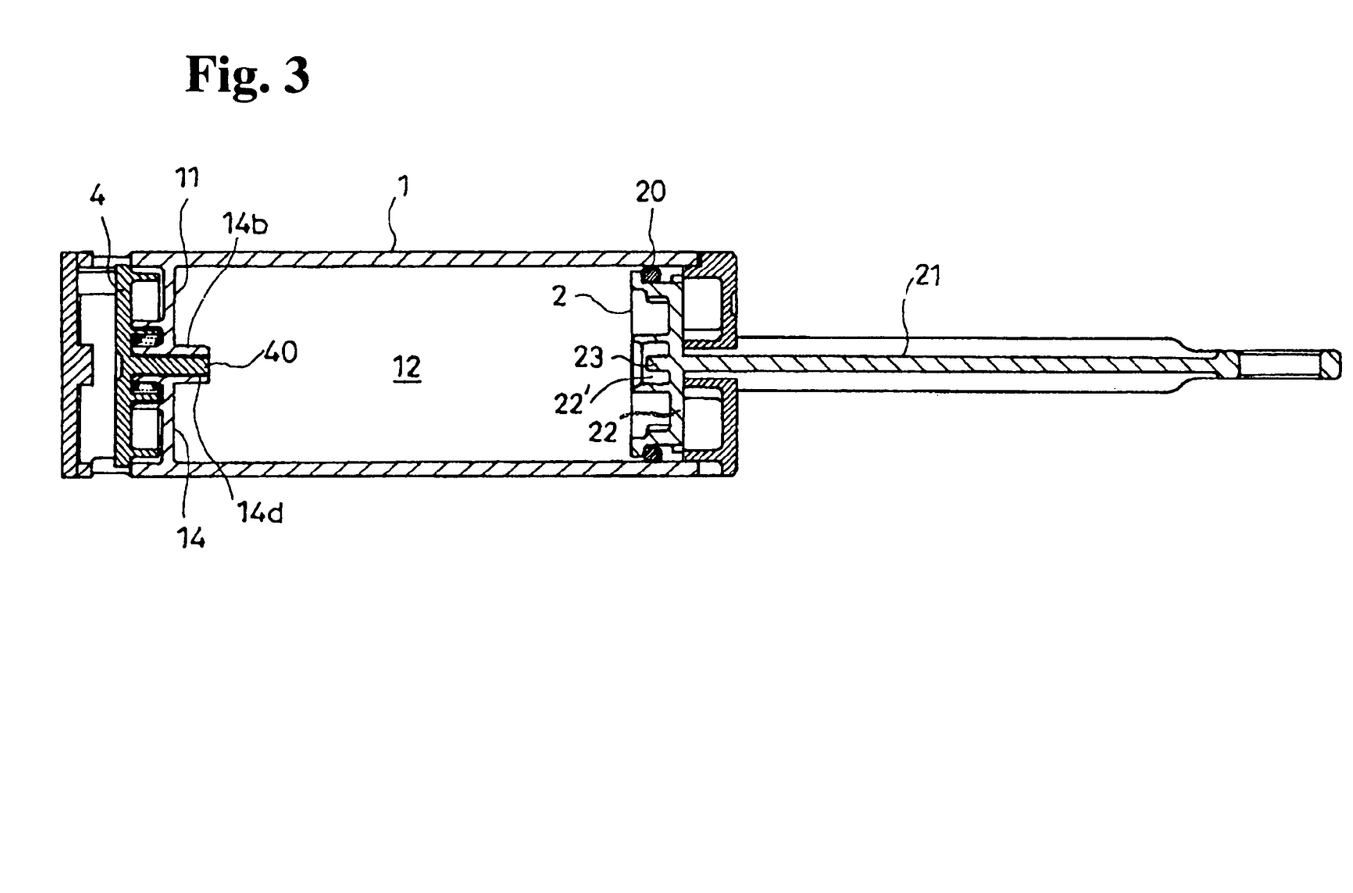
FIG. 3 is a sectional view of the same.
Figure 4:
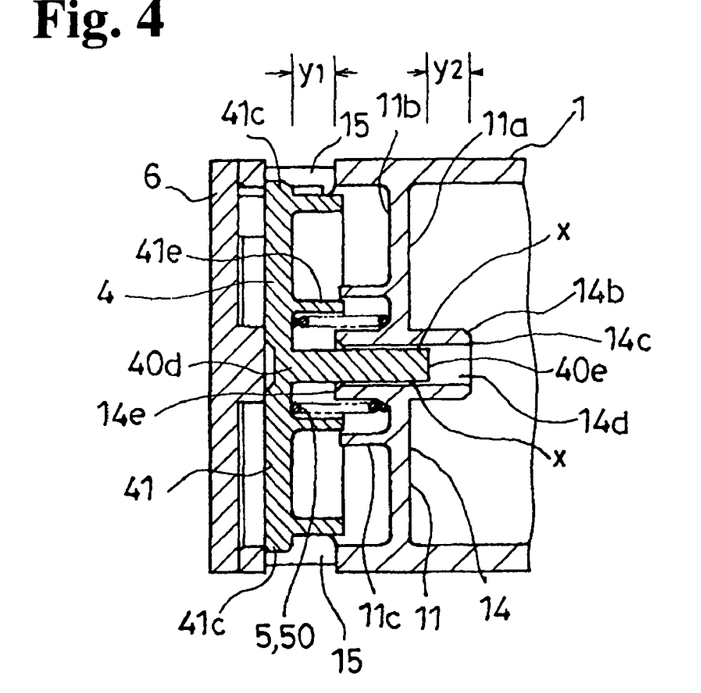
FIG. 4 is a sectional view of the same with essential parts enlarged.
Figure 5:
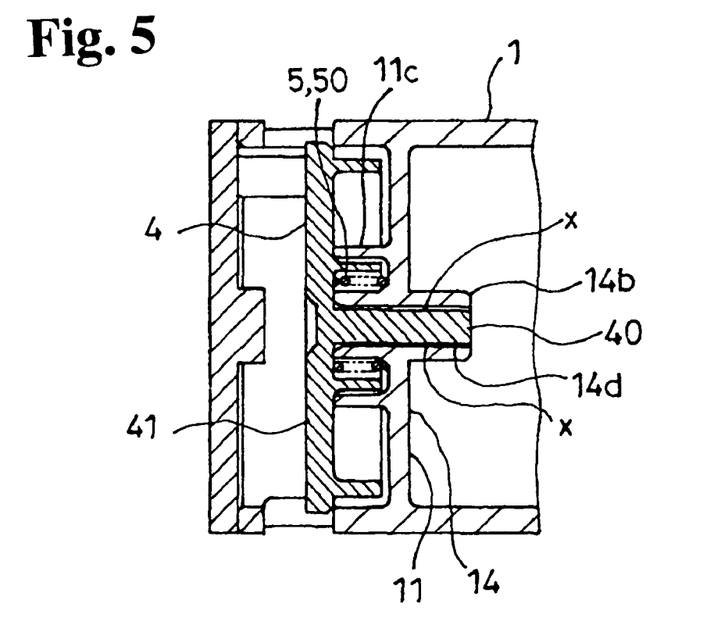
FIG. 5 is a sectional view of the same with essential parts enlarged.
Figure 6:
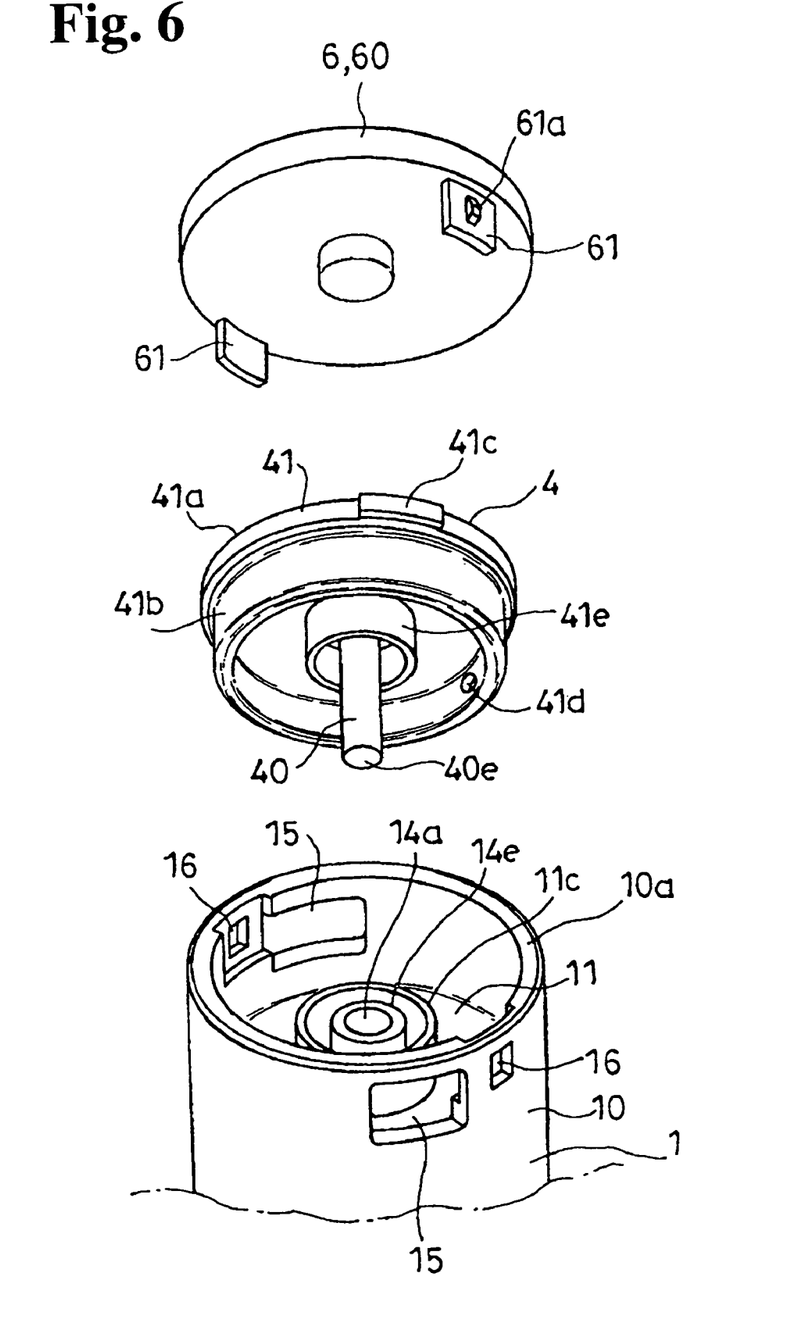
FIG. 6 is a perspective view of the same with essential parts detached.
Figure 7:
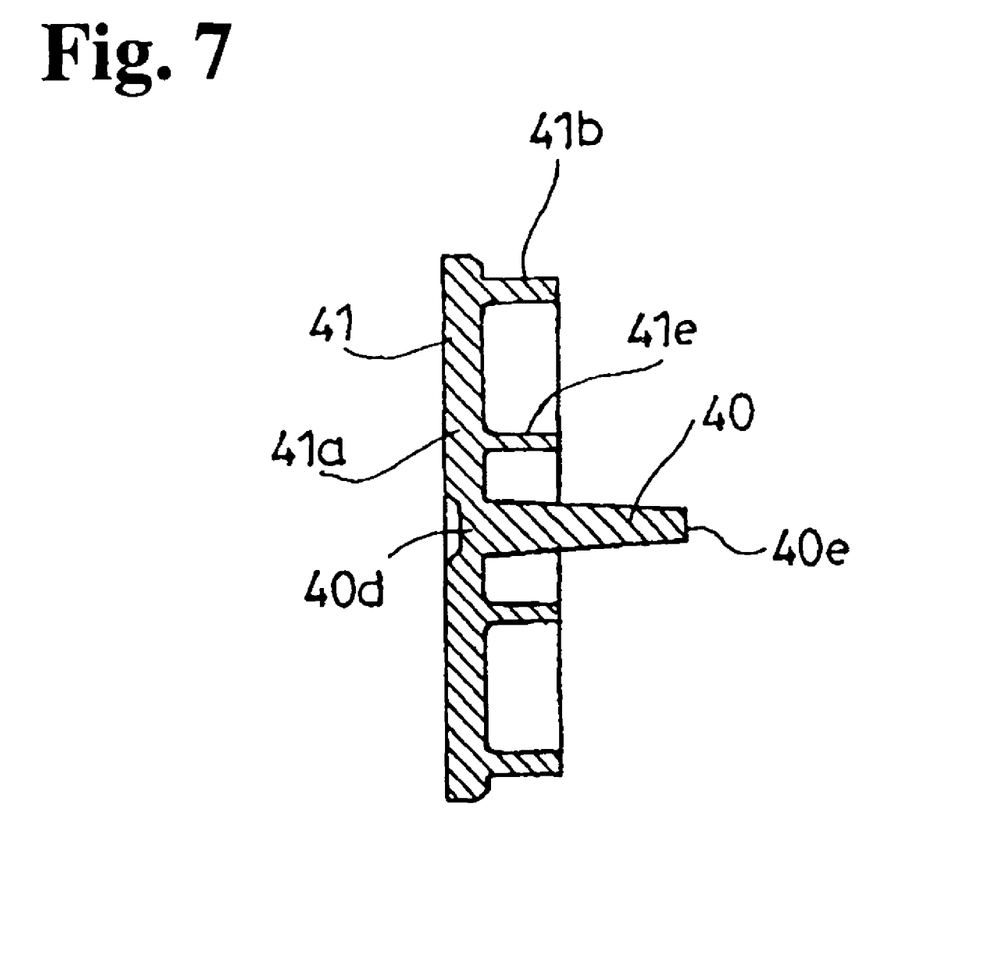
FIG. 7 is a sectional view showing another example of constitution of the stopper-like body pertaining to the same embodiment.

Here, FIG. 1 shows a damper device pertaining to an embodiment from the side view, FIG. 2 and FIG. 3 as sectional views, FIG. 4 and FIG. 5 with essential parts enlarged, and FIG. 6 in a state having detached some of the parts constituting this damper device. FIG. 1 and FIG. 2 show the manner when the piston body 2 is pushed in completely, that is, when it is advanced completely, and FIG. 3 shows when the piston body 2 is retreated completely. In FIG. 3 and FIG. 5, the dimension of insertion of the shaft part 40 of the stopper-like body 4 into the run-through hole 14d has become greatest. Also, FIG. 7 shows an example having changed a part of the constitution of the stopper-like body 4 shown in FIG. 1 to FIG. 6.

Figure 8:
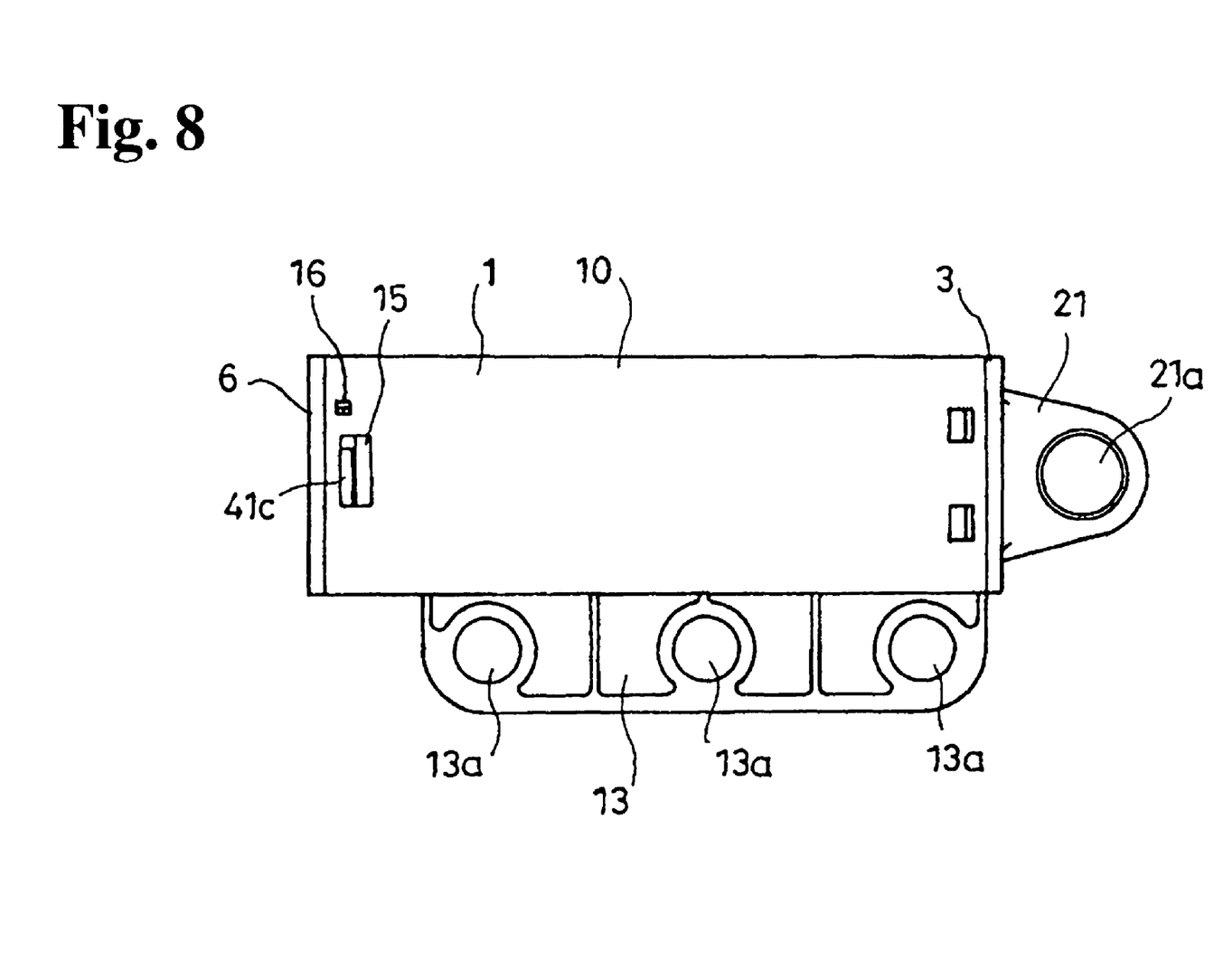
FIG. 8 is a side view of a damper device pertaining to another embodiment of the present invention, with a part of the constitution made different from the example shown in FIG. 1 to FIG. 7.
Figure 9:
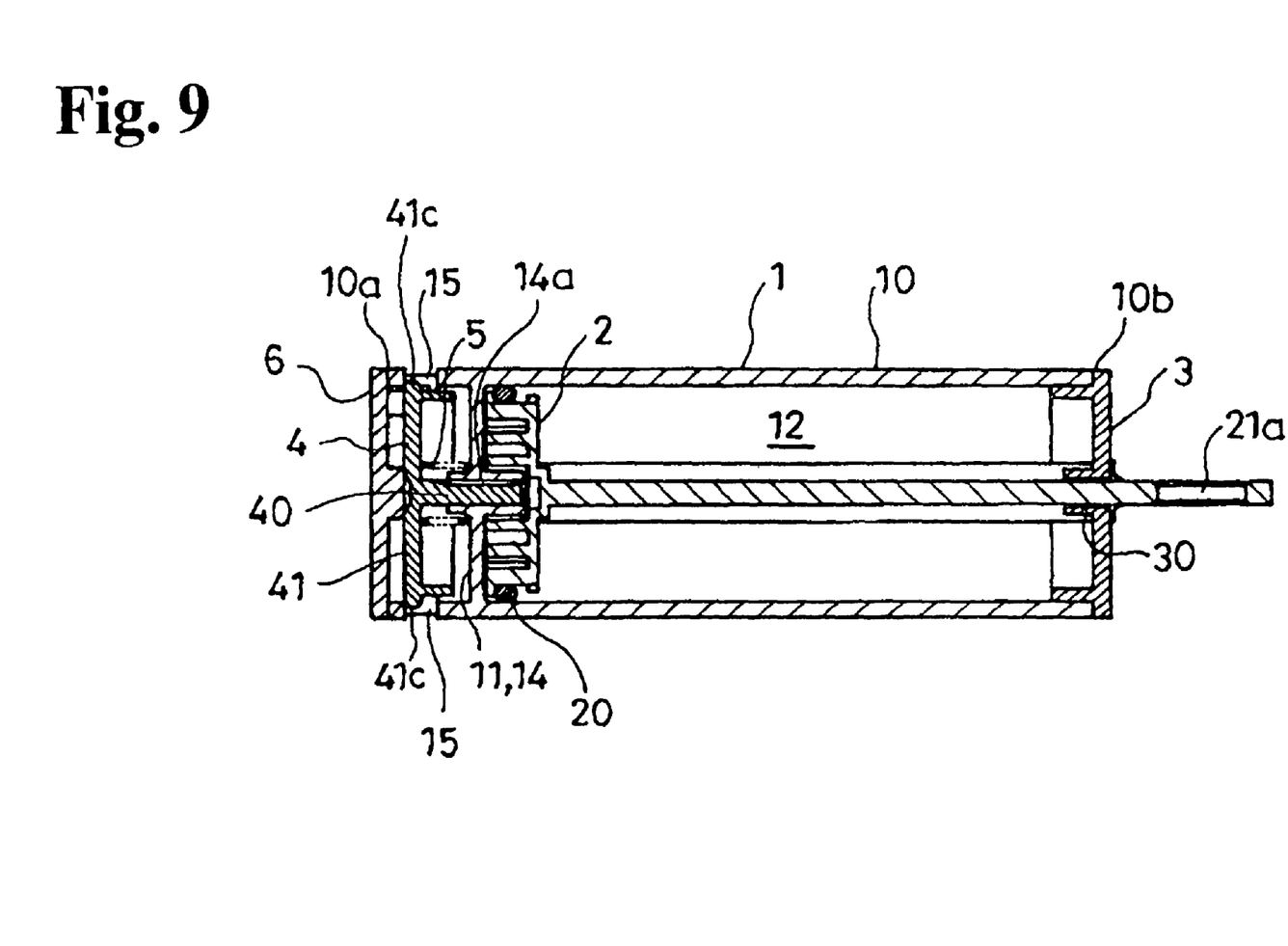
FIG. 9 is a sectional view of the same.
Figure 10:
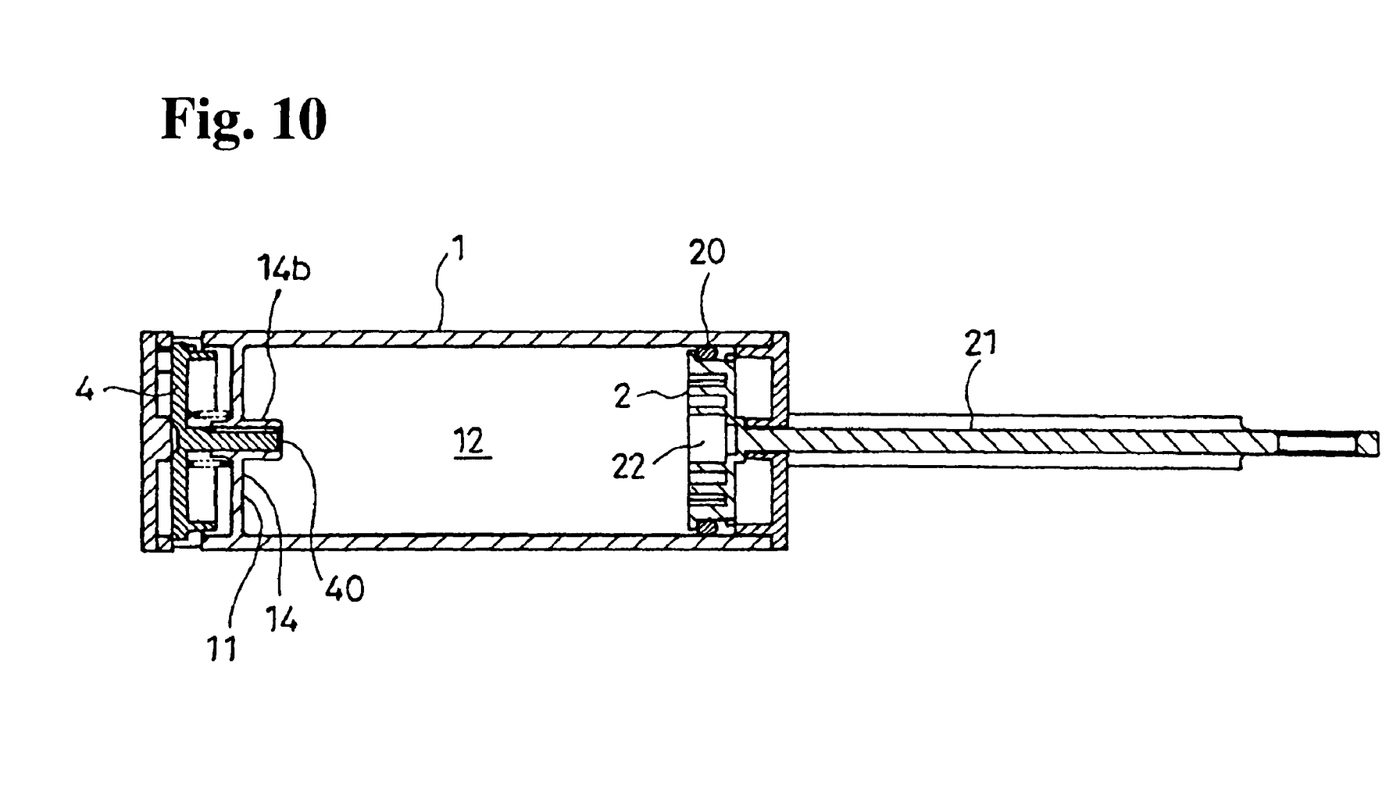
FIG. 10 is a sectional view of the same.
Figure 11:
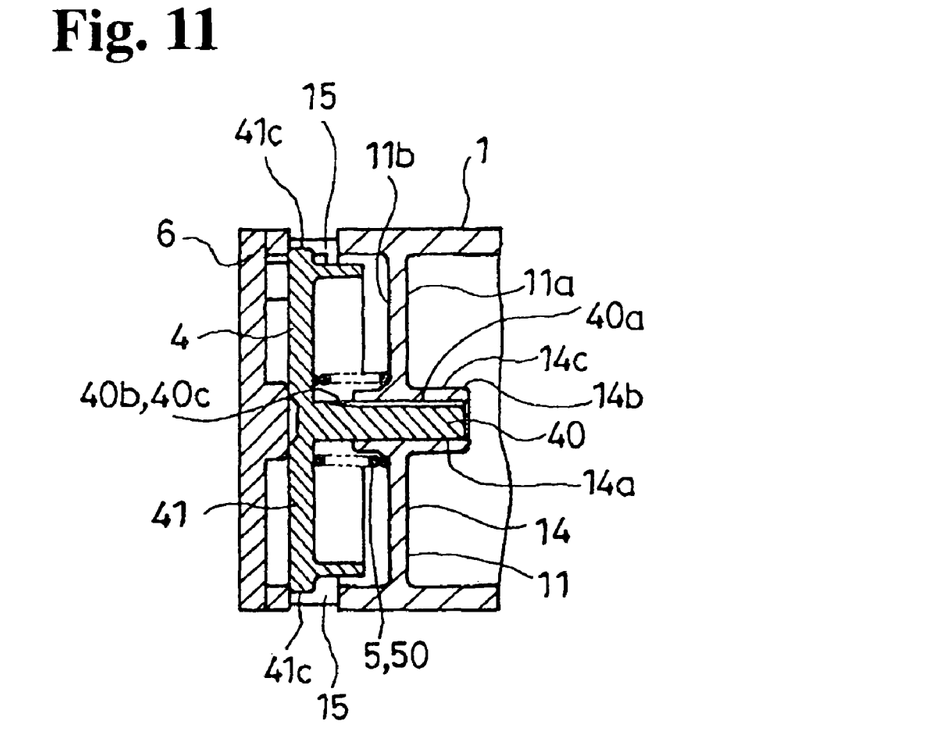
FIG. 11 is a sectional view of the same with essential parts enlarged.
Figure 12:
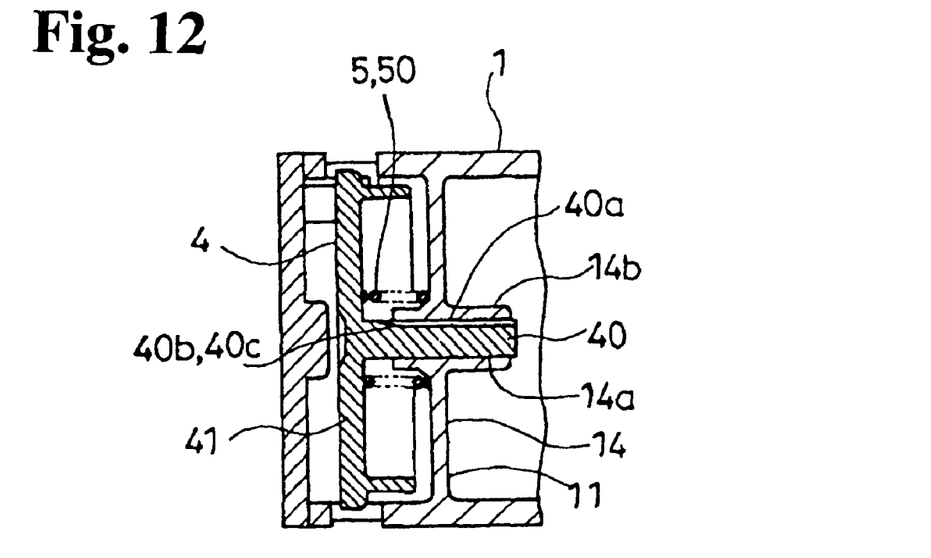
FIG. 12 is a sectional view of the same with essential parts enlarged.
Figure 13:
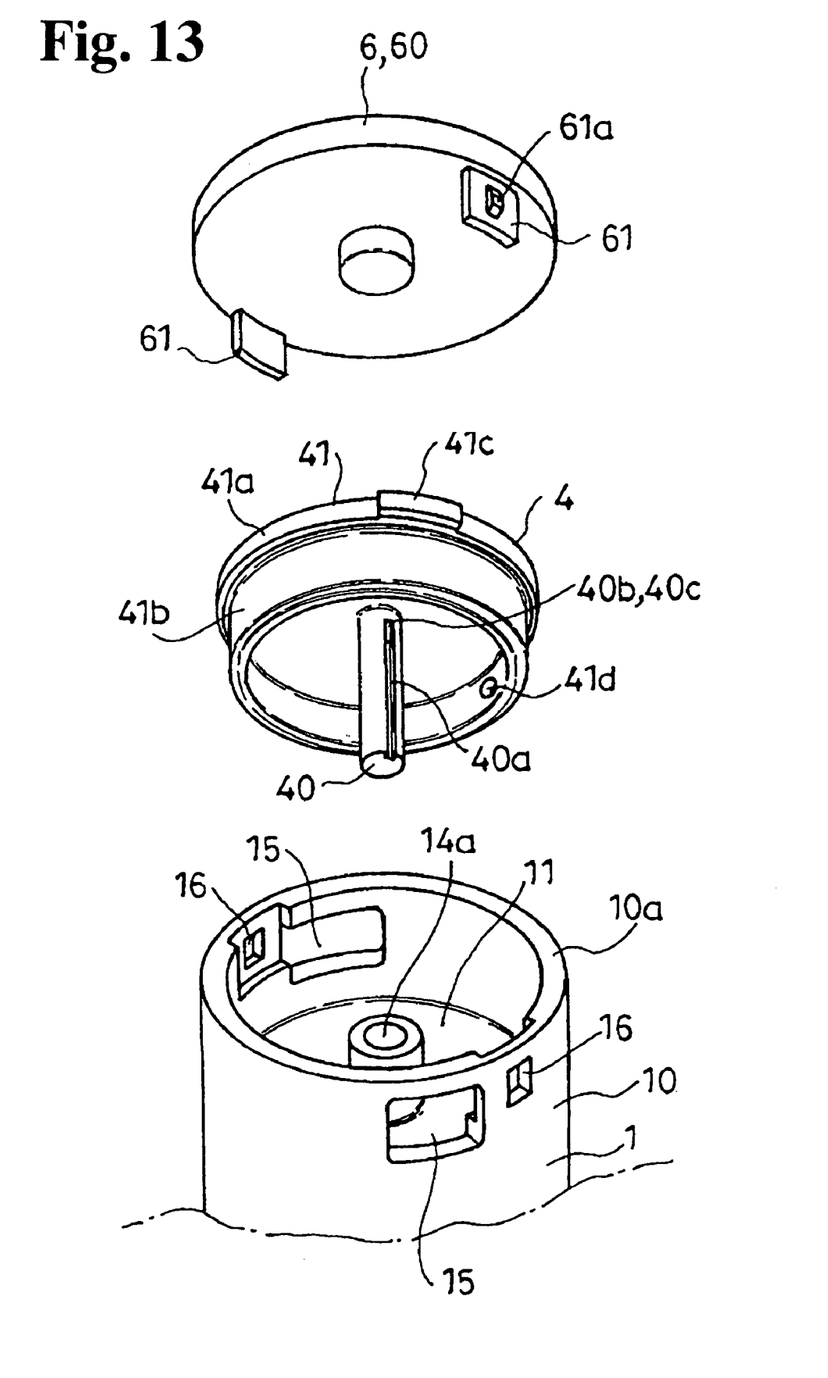
FIG. 13 is a perspective view of the same with essential parts detached.

Also, FIG. 8 shows a damper device from the side view, making different a part of the constitution of the damper device shown in FIG. 1 to FIG. 7, FIG. 9 and FIG. 10 as sectional views, FIG. 11 and FIG. 12 with essential parts enlarged, and FIG. 13 in a state having detached some of the parts constituting this damper device. FIG. 8 and FIG. 9 show when the piston body 2 is pushed completely, that is, when it is advanced completely, and FIG. 10 shows when the piston body 2 is retreated completely.

The damper device pertaining to this embodiment has a cylinder body 1 and a piston body 2, and at least either one side of these is attached to an article subject to damping not illustrated, whereby damping is applied to the movement or relative movement of the article subject to damping.

For example, if the piston body 2 is attached to an article subject to damping as a movable body and the cylinder body 1 is attached to a fixed body not illustrated, it is possible to make it such that the piston body 2 is moved by the movement of the article subject to damping whereby damping force is applied to this movement of the article subject to damping via the piston body 2.

Also, if the piston body 2 is attached to an article subject to damping as a movable body, and the cylinder body 1 is attached to an article subject to damping as another movable body, it is possible to make it such that both the cylinder body 1 and the piston body 2 are moved by the movement of the two articles subject to damping toward the direction of approaching or the direction of moving away from each other, whereby respective damping forces are applied to this movement of the two articles subject to damping.

In the illustrated example, the cylinder body 1 is constituted in a manner such that the inside of a cylindrical body 10 having a cylindrical shape having both cylinder ends 10a and 10b open is divided into two parts by a partitioning plate 11. The partitioning plate 11 is furnished in a position leaning toward one cylinder end 10a of the cylindrical body 10, and it is made such that the space between this partitioning plate 11 and the other cylinder end 10b of the cylindrical body 10 functions as an internal space 12 of the cylinder body 1. In the illustrated example, on the outside of the cylinder body 1, there is formed a tongue piece part 13, which continues long following the direction of the cylinder axis of this cylinder body 1, and on this tongue piece part 13 there is formed a hole 13a for fixing the cylinder body 1.

The piston body 2 is constituted as a circular tray shape having an outer diameter about equal to the inner diameter of such cylinder body 1. Sealing 20 is inserted around the outer perimeter part of the piston body 2 such that the space between the outer perimeter part of the piston body 2 and the inner perimeter part of the cylinder body 1 is sealed in an air-tight state by this sealing 20. On the side of the piston body 2 facing the other cylinder end 10b of the cylinder body 1, one end of a long and thin plate-shaped piston rod 21 is bonded integrally. The other cylinder end 10b of the cylinder body 1 is closed by a cover body 3 having a passage hole 30 for this piston rod 21. The piston rod 21 projects outside the cylinder body 1 through the passage hole 30 of this cover body 3, and also, on its projecting end there is formed a hole 21a for fixing to the article subject to damping.

On the inner recess part 14 of the cylinder body 1 facing the piston body 2, in the illustrated example, on said partitioning plate 11, there is formed a run-through hole 14d or a ventilation hole 14a. In the illustrated example, such run-through hole 14d or ventilation hole 14a is provided in about the center part of the partitioning plate 11, and it is formed on such partitioning plate 11 by a pipe-shaped body 14b having a part projecting from the inside of the partitioning plate 11 facing the piston body 2 and a part projecting outside of the partitioning plate 11.

The cylinder body 1 also has a stopper-like body 4 having a shaft part 40 inserted into this run-through hole 14d or ventilation hole 14a to be capable of movement, and an impelling means 5 for this stopper-like body 4.

The stopper-like body 4 has a head part 41 integrally having said shaft part 40. In the illustrated example, such head part 41 is made having a circumferential upright part 41b formed on the edge part on the side of one face of a disk-shaped body 41a having an outer diameter about equal to the inner diameter of the cylindrical body 10 constituting the cylinder body 1. The shaft part 40 is provided with one end of the shaft integrally bonded to about the center part on the side of one face of this head part 41 so as to project from this head part 41 toward the direction orthogonal to this one face.

In the illustrated example, a window hole-shaped part coupled with 15 is formed on the cylindrical body 10 constituting the cylinder body 1 on the outside of said partitioning plate 11, which partitions this cylindrical body 10, and a claw-shaped coupling part 41c, which enters into said part coupled with 15, is provided on the head part 41 of said stopper-like body 4. The part coupled with 15 is formed respectively on both sides in the diameter direction of the cylindrical body 10, and the coupling part 41c is formed corresponding to these respectively on both sides in the diameter direction of said head part 41. The coupling part 41c is constituted so as to form a rib shape continuing long following the disk-shaped body constituting the head part 41. The dimension between the projecting ends of the pair of coupling parts 41c and 41c is made so as to become somewhat larger than the inner diameter of the cylindrical body 10 constituting the cylinder body 1. On the other hand, the part coupled with 15 is constituted as an about rectangular-shaped run-through hole continuing long in the circumferential direction of the cylindrical part 10. The length of this part coupled with 15 is constituted so as to become longer than the length of the coupling part 41c.

By this, in this example, it is made such that the stopper-like body 4 is inserted from outside of the partitioning plate 11 of the cylindrical body 10 constituting the cylinder body 1 into this cylindrical body 10 in a manner such that the shaft part 40 is inserted into the ventilation hole 14a, whereby the coupling part 14c is made to be coupled with the part coupled with 15 and the state having the shaft part 40 of the stopper-like body 4 inserted into this ventilation hole 14a can be maintained.

In the illustrated example, the cylindrical body 10 constituting the cylinder body 1 is constituted by plastic molding, and it is made such mainly the side of this cylindrical body 10 is once elastically deformed by the coupling part 41c during said insertion of the stopper-like body 4 into this cylindrical body 10, and the coupling part 14c is coupled with the part coupled with 15 by elastic return in the position where the coupling part 14c entered into the part coupled with 15. The dimension of the part coupled with 15 in the direction of the cylinder axis of the cylinder body 1 is somewhat larger than the dimension of the coupling part 41c in this direction, and it is made such that the stopper-like body 4 thus combined on the cylinder body 1 can move within a fixed range in the direction of the cylinder axis of the cylinder body 1.

The impelling means 5, in the illustrated example, is constituted by a compression coil spring 50, which is provided so as to be wound on the outside of the shaft part 40 of said stopper-like body 4 and the projecting part of the pipe-shaped body 14b constituting the ventilation hole 14a positioned outside of the partitioning plate 11, and has one end of the spring pushed against the head part 41 of the stopper-like body 4 and the other end of the spring pushed against the outside of the partitioning plate 11. The stopper-like body 4 combined on the cylinder body 1 in said manner by this spring 50 is positioned in a manner so as to push the coupling part 41c against the window edge of the part coupled with 15, which is positioned on the side of one cylinder end 10a of the cylindrical body 10.

In the example shown in FIG. 1 to FIG. 7, the shaft part 40 of the stopper-like body 4 is inserted into the run-through hole 14d so as to be capable of movement. Also, it is made such that a fluid (air in the illustrated example) passage gap x is formed between the shaft part 40 and the run-through hole 14d, more concretely, between the outer face of the shaft part 40 and the inner face of the run-through hole 14d. The shaft part 40 has a base part 40d, being on the side of bonding with the head part 41, and a leading end 40e. Also, such shaft part 40 is inserted from outside of the cylinder body 1 into the run-through hole 14d, and the head part 41 is positioned on the outside of the cylinder body 1. Also, it is made such that by the impulsion of said impelling means 5, an interval y1 is formed between the head part 41 of the stopper-like body 4 and the pipe end positioned on the outside of the partitioning plate 11, that is, the outer end 14e, of the pipe-shaped body 14b forming the run-through hole, accordingly the shaft part 40 does not enter completely into the run-through hole 14d, and furthermore, an interval y2 about equal to said interval y1 is formed in the illustrated example also between the leading end 40e of the shaft part 40 and the hole opening, that is, the inner end 14c, of the run-through hole 14d positioned on the side of the internal space 12 of the cylinder body 1 (FIG. 4).

Also, in this example, it is made such that the dimension of insertion of the shaft part 40 of the stopper-like body 4 inside the run-through hole 14d changes by the change of pressure of the internal space 12 inside the cylinder body 1 caused by the movement or relative movement of the piston body 2. Concretely, in the illustrated example, it is made such that the internal space 12 becomes negatively pressurized when the piston body 2 moves toward the direction moving away from the inner recess part of the cylinder body 1, whereby the stopper-like body 4 is moved, at most, up to the position where the head part 41 of the stopper-like body 4 strikes the outer end 14e of the pipe-shaped body 14b, while causing force to accumulate in said impelling means 5.

Meanwhile, when the piston body 22 is moved or relatively moved toward the direction of approaching the inner recess part 14 of the cylinder body 11 by the movement or relative movement of the article subject to damping, the air inside the cylinder body 11 is exhausted through the space between the shaft part 40 of the stopper-like body 44 and the run-through hole 14d.

In the illustrated example, a first circumferential wall 41e surrounding the base part 40d of the shaft part 40 is formed centered on this base part 40d on the side of the head part 41 of the stopper-like body 4 where the shaft part 40 is provided, and a second circumferential wall 11c surrounding the pipe-shaped body 14b is formed centered on this pipe-shaped body 14b on the outside of the partitioning plate 11 of the cylinder body 1. It is made such that the inner diameter of the second circumferential wall 11c is somewhat larger than the outer diameter of the first circumferential wall 41e, and also, the projecting end of the first circumferential wall 41e and the projecting end of the second circumferential wall 11c overlap somewhat in the state when the stopper-like body 4 is positioned in the position where the dimension of insertion of the shaft part 40 into the run-through hole 14d is made smallest by the impelling means 5. Also, a run-through hole 41d is formed on the circumferential upright part 41b of the stopper-like body 44, and the air exhausted from the run-through hole 14d is sent out through this run-through hole 41d and the part coupled with 15, while on the other hand, the air taken into the run-through hole 14d is taken in from the outside through the run-through hole 41d and the part coupled with 15. Furthermore it enters into the run-through hole 14d through the space between the first circumferential wall 41e and the second circumferential wall 11c. By this, in the illustrated example, it is made such that dirt and dust are not let in to the extent possible between the run-through hole 14d and the shaft part 40 of the stopper-like body 4 during intake of air into the internal space 12 of the cylinder body 1.

When the piston body 22 is moved or relatively moved by the movement or relative movement of the article subject to damping, the pressure inside the cylinder body 11 changes, and because of that, the shaft part 40 of the stopper-like body 44 also is moved inside the run-through hole 14d, and the dimension of insertion of this shaft part 40 inside the run-through hole 14d changes. Actually, because ideal fluids do not exist and all fluids have constant viscosity, as this dimension of insertion becomes larger, the range of the passage gap x becomes longer and it becomes more difficult for the fluid to pass, while on the other hand, as this dimension of insertion becomes smaller, the range of the passage gap x becomes shorter and it becomes easier for the fluid to pass. By this, typically, it is made such that damping is applied to the retreating movement or relative retreating movement of the piston body 22 and damping is not applied to the advancing or relative advancing movement of the piston body 22, whereby it is possible to have the damping force applied to the movement or relative movement in a certain direction of the article subject to damping.

In the illustrated example, on the side of the piston body 22 facing the inner recess part 14 of the cylinder body 11, there is formed a recessed place 22' in which the inner end 14*c* of the pipe-shaped body 14*b* constituting the run-through hole 14*d* is received, and the position where the inner end 14*c* of the pipe-shaped body 14*b* struck the bottom face of this recessed place 22' becomes the position where the piston body 22 advanced completely. In the illustrated example, a protruding part 23, which enters inside the run-through hole 14*d*, is formed in the center part of the recessed place 22' of the piston body 22 in the state when this piston body 22 advanced completely. When the piston body 22 is retracted, the stopper-like body 44 is moved so as to make the coupling part 41*c* approach the window edge of the part coupled with 15 on the side of the other cylinder end 10*b* of the cylindrical body 10 and said spring 50 is compressed (FIG. 5). When the retreat of the piston body 22 stops, the stopper-like body 44 is pushed back by the impelling force of the spring 50 (FIG. 4).

If there is provided on the shaft part 40 of said stopper-like body 11 a throttle structure or a narrow portion, which changes the pitch of the fluid passage gap x between this shaft part 40 and the run-through hole 14*d* when this shaft part 40 moves by a change of pressure caused by the movement or relative movement of the piston body 2, then it is made even more difficult or even easier for the fluid to pass through the passage gap x on the moment of movement of the shaft part 40 of the stopper-like body 4, whereby it is possible to have said damping force work markedly greater or smaller. It is possible to adjust the damping force, and the like, by providing a groove following the axial direction is provided on the shaft part 40 of such stopper body 4, or providing a groove following the axial direction of the hole on the inner wall of the run-through hole 14*b*. Also, one may also provide a throttle part 40*b* to be described later in the example shown in FIG. 8 to FIG. 13 as an advancing throttle structure in such groove.

FIG. 7 shows an example in which the shaft part 40 of the stopper-like body 4 in the example shown in FIG. 1 to FIG. 6 is made thicker gradually going from the side of the leading end 40*e* inserted into the run-through hole 14*d* toward the side of its base part 40*d*, whereby it is made even more difficult for the fluid to pass through the passage gap x when the dimension of insertion of the shaft part 40 into the run-through hole 14*d* increases. That is, in this example in FIG. 7, it is made such that the shape of such shaft part 40 functions as said throttle structure.

In the example explained above, the fluid is taken as air (gas), but the example explained above functions in the same manner even in the case when the fluid is taken as liquid. For example, in the case when the article subject to damping is used being submerged in a liquid, and in such case as when the cylinder body 1 is further housed in an external case not illustrated and it is made such that the inside of this external case is filled with a fluid, it is possible to apply damping to the article subject to damping by using these liquids.

Next, in the example shown in FIG. 8 to FIG. 13, it is made such that a throttle part 40*b* of the shaft part 40 of the stopper-like body 4 to be described later is positioned outside of the ventilation hole 14*a* of the cylinder body 1, that is, outside of the outer end of the pipe-shaped body 14*b*, by said impelling means 5 (FIG. 4).

The shaft part 40 of said stopper-like body 4 has a groove 40*a* following the direction of sliding starting from the shaft end of this shaft part 40 positioned on the inward side (internal space 12 side) of the cylinder body 1, and a throttle part 40*b*, which reduces both or either one of the depth and the width of this groove, is formed on the side of the terminal end of this groove 40*a*.

Also, it is made such that the throttle part 40*b* of the shaft part 40 of the stopper-like body 4 is positioned outside of the ventilation hole 14*a* of the cylinder body 1 by the impulsion of said impelling means 5, and the throttle part 40*b* of the shaft part 40 of the stopper-like body 4 enters inside the ventilation hole 14*a* in opposition to said impulsion by the change of pressure caused by the movement or relative movement of the piston body 2 in the direction moving away from the inner recess part 14 of the cylinder body 1.

When the piston body 2 is moved or relatively moved toward the direction of approaching the inner recess part 14 of the cylinder body 1 by the movement or relative movement of the article subject to damping, the air inside the cylinder body 1 is exhausted through the space between the groove of the shaft part 40 of the stopper-like body 4 and the inner face of the ventilation hole 14*a*.

In the illustrated example, a run-through hole 41*d* is formed on the circumferential upright part 41*b* of the stopper-like body 4, and the air exhausted from the ventilation hole 14*a* is sent out through this run-through hole 41*d* and the part coupled with 15.

When the piston body 2 is moved or relatively moved toward the direction of moving away from the inner recess part 14 of the cylinder body 1 by the movement or relative movement of the article subject to damping, the inside of the cylinder body 1 becomes negatively pressurized and therefore a force toward the direction of being pulled in the direction of movement of the piston body 2 is applied to the shaft part 40 of the stopper-like body 4, and the stopper-like body 4 is moved in opposition to the impulsion of the impelling means 5. When the stopper-like body 4 is moved thus, a part of said throttle part 40*b* enters inside the ventilation hole 14*a*, and because of that, it becomes more difficult for the air to be taken inside the cylinder, and damping is applied to the movement or relative movement of the piston body 2. By this, it is possible to have damping force applied to the movement or relative movement of the article subject to damping.

In the illustrated example, on the side of the piston body 2 facing the inner recess part 14 of the cylinder body 1, there is formed a recessed place 22 in which the inner end 14*c* of the pipe-shaped body 14*b* constituting the ventilation hole 14*a* is received, and the position where the inner end 14*c* of the pipe-shaped body 14*b* struck the bottom face of this recessed place 22 becomes the position where the piston body 2 advanced completely. When the piston body 2 is retracted, the stopper-like body 4 is moved so as to make the coupling part 41*c* approach the window edge of the part coupled with 15 on the side of the other cylinder end 10*b* of the cylindrical body 10 and said spring 50 is compressed (FIG. 12). When the retreat of the piston body 2 stops, the stopper-like body 4 is pushed back by the impelling force of the spring 50 and the throttle part 40*b* is positioned again on the outside of the ventilation hole 14*a* (FIG. 11).

In the illustrated example, the throttle part 40*b* is constituted by forming the groove bottom on the side of the terminal end of the groove of the shaft part 40 of the stopper-like body 4 in a tapered shape 40*c*. By this, it is made such that the resistance to the movement of the piston body 2 becomes greater as the amount of insertion of the throttle part 40*b* into the ventilation hole 14*a* becomes greater. In the case when there is suitable clearance between the outer perimeter face of the shaft part 40 of the stopper-like body 4 and the inner perimeter face of the ventilation hole 14a, entrance of air into the internal space 12 of the cylinder body 1 is allowable by this clearance, and therefore in this case it doesn't matter even if it is made such that the throttle part 40b enters completely into the ventilation hole 14a.

Also, both in the example shown in FIG. 1 to FIG. 7 and in the example shown in FIG. 8 to FIG. 13, the damper device has a cover 6, which closes the cylinder end on the outside of the partitioning plate 11 on the cylindrical body 10 constituting the cylinder body 1 in the state when the head part 41 of the stopper-like body 4 is held between it and this partitioning plate 11.

Such cover 6 has a disk-shaped body 60 about equal to the outer diameter of the cylindrical body 10 constituting the cylinder body 1, and it has a coupling arm 61 projecting from its edge part on the side of one face of this disk-shaped body 60. Such coupling arm 61 is provided respectively on both sides in the diameter direction of the disk-shaped body. A small bump 61a is formed on the outside of the leading end part of the coupling arm 61, and it is made such that such coupling arm 61 is inserted inside this cylindrical body 10 from the side of one cylinder end of the cylindrical body 10, whereby this small bump 61a is coupled with a coupling window 16 formed on the side of said coupling part 15 of the cylindrical body 10.

By this, in the illustrated example, it is made such that accidents are not caused, such as a member, or the like, disposed in the periphery of the place where the damper device is placed pushing against the stopper-like body, or the like, and causing the throttle part 40b to be inserted unexpectedly inside the ventilation hole 14a.

The disclosure of Japanese Patent Applications No. 2007-091728 filed on Mar. 30, 2007, and No. 2007-142680 filed on May 29, 2007 are incorporated as a reference.

While the invention has been explained with reference to the specific embodiments of the invention, the explanation is illustrative and the invention is limited only by the appended claims.

What is claimed is:

1. A damper device, comprising:
a cylinder body; and
a piston body slidably disposed in the cylinder body, at least one of the cylinder body and the piston body being adapted to be attached to an article subject to damping so that the damping is applied to movement or relative movement of the article subject to the damping, said cylinder body comprising:
an inner part facing the piston body and having a run-through hole; and
a stopper body disposed at a side, opposite to the piston body relative to the inner part and having a shaft part slidably situated in the run-through hole, said shaft part forming a fluid passage gap between an outer surface of the shaft part and an inner surface of the run-through hole, said shaft part being arranged such that an insertion length of the shaft part into the run-through hole changes by a change of pressure caused by the movement or relative movement of the piston body,
wherein the shaft part and the run-through hole form a throttle structure such that an amount of fluid passing through the fluid passage gap between the outer surface of the shaft and the inner surface of the run-through hole changes by the insertion length of the shaft part, and the damping changes by the insertion length of the shaft part, and wherein the inner part includes a partitioning plate for partitioning, the cylinder body, and a pipe-shaped body having a part projecting in an axial direction from the partitioning plate facing toward the piston body and a part projecting in the axial direction from the partitioning plate toward the stopper body.

2. The damper device according to claim 1, wherein the shaft part of the stopper body is made thicker gradually from a leading end inserted into the run-through hole toward a base part thereof.

3. The damper device according to claim 1, wherein the stopper body includes a male coupling part for coupling with a female coupling part on the cylinder body in a state that the shaft part is inserted into the run-through hole.

4. The damper device according to claim 3, wherein the cylinder body has a female coupling part with a window hole formed on an outside of the partitioning plate, and
the stopper body has a head part integrally formed with the shaft part, and a male coupling part having a claw-shape for coupling with said female coupling part.

5. The damper device according to claim 4, further comprising a cover for closing an end of the partitioning plate on the cylinder body in a state that the head part of the stopper body is held between the cover and the partitioning plate.

6. The damper device according to claim 1, further comprising impelling means for impelling the stopper body to move in a direction away from the piston body,
wherein the shaft part of the stopper body has a groove extending along a longitudinal direction thereof from a shaft end of the shaft part positioned on an inward side of the cylinder body, said groove forming the throttle structure, at a terminal end of the groove, reducing at least one of a depth and a width of the groove, and
the throttle structure of the shaft part is positioned outside the run-through hole of the cylinder body by said impelling means, and the throttle structure of the shaft part enters inside the run-through hole by the change of pressure caused by the movement or relative movement of the piston body toward a direction moving away from the inner part of the cylinder body while causing force to accumulate in said impelling means.

7. The damper device according to claim 5, wherein the groove has a groove bottom on the side of the terminal end in a tapered shape to form the throttle structure.

8. The damper device according to claim 6, wherein the stopper body has a male coupling part for coupling with a female coupling part on the side of the cylinder body in a state that the shaft part is inserted into the run-through hole.

9. The damper device according to claim 1, wherein the shaft part of the stopper body directly faces the piston to regulate the fluid passing through the fluid passage gap.

10. The damper device according to claim 1, wherein the pipe-shaped body has a length greater than a thickness of the partitioning plate to form the throttle structure greater than the thickness of the partitioning plate.

11. A damper device, comprising:
a cylinder body; and
a piston body slidably disposed in the cylinder body, at least one of the cylinder body and the piston body being adapted to be attached to an article subject to damping so that the damping is applied to movement or relative movement of the article subject to the damping, said cylinder body comprising:
an inner part facing the piston body and having a run-through hole; and
a stopper body disposed at a side opposite to the piston body relative to the inner part and having a shaft part slidably situated in the run-through hole, said shaft part forming a fluid passage gap between the shaft part and the run-through hole, said shaft part being arranged such that an insertion length of the shaft part into the run-through hole changes by a change of pressure caused by the movement or relative movement of the piston body, wherein the shaft part is arranged such that an amount of fluid passing through the fluid passage gap changes by the insertion length of the shaft part, and the damping changes by the insertion length of the shaft part, and wherein the inner part includes a partitioning plate for partitioning the cylinder body, and a pipe-shaped body projecting toward the piston body from the partitioning plate and having the run-through hole; and said piston body includes a protruding part and a recessed portion around the protruding part, said protruding part entering into the run-through hole when the piston body abuts against the partitioning plate.

* * * * *